March 2, 1965 G. W. HOWARD, JR 3,171,278
BELT TENSION TESTER
Filed April 15, 1963

INVENTOR.
Graham W. Howard Jr.
BY
ATTORNEY

3,171,278
BELT TENSION TESTER
Graham W. Howard, Jr., 5996 S. Crocker,
Littleton, Colo.
Filed Apr. 15, 1963, Ser. No. 272,955
2 Claims. (Cl. 73—144)

This invention relates to belt tension testers and more particularly to small, portable tools for testing the tension in drive belts mounted between two pulleys and the like.

For optimum wear and proper operation, a drive belt should be of proper tension. This is particularly true with V-belts. When the belt is too tight, excessive wear occurs from the stretching and rubbing in the grooves of the pulleys, and when the belt is too loose, slippage between the belt and the pulleys increases the wear. The tension on most V-belts may be easily adjusted by a simple movement of one or both of the pulleys on which it is mounted or by a change of tension of an idler pulley, depending on the particular system on which it is used.

Included among the objects and advantages of the present invention is a portable, simple instrument for testing belt tensions, which may be easily used to determine the tension of a drive belt. The tester utilizes a spring plunger to produce a three-point contact with a belt, and by measurement of the pressure on the plunger at the three-point contact the tension on the belt is determined. The instrument provides a fast and efficient belt testing system which does not require additional equipment.

These and other objects and advantages of the invention may be readily ascertained by referring to the following description and appended illustrations in which.

Figure 1:
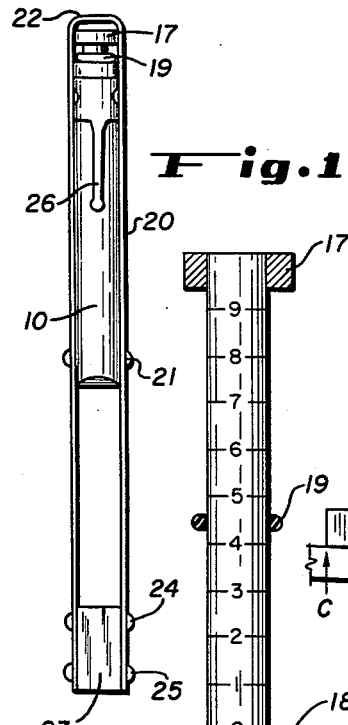
FIG. 1 is a side elevational view of a belt tension tester according to the invention in its folded, portable position.

The belt tester illustrated includes a main barrel 10 which is provided with one rounded blunt end 11 and an open end 12. A calibrated plunger 13 is reciprocally mounted in the barrel through the open end 12. A helically wound spring 14 is mounted internally in the barrel around the plunger 13, and its lower end 15 is bent back across the diameter of the spring. This end 15 is mounted in notch 16 at the bottom of the plunger. The calibrations on plunger 13 extend up the exposed part from the number 0 through 9 adjacent the top 17 thereof. A soft, flexible O-ring 19 is mounted on the plunger and is arranged to be moved up and down the plunger, but it is tight enough to retain its position when not subjected to force. Mounted on the lower end of the barrel is a U-shaped arm 20 pivotally secured to the bottom of the tube by means of pivot pin 21. The U-shaped arm 20 is strap metal secured to both sides of the barrel 10 by means of the pivot pin 21. One end 22 thereof is closed and the open end is closed by means of a piece of square stock 23 which is riveted in position by means of rivets 24 and 25. A pocket clip 26 is mounted on the barrel to provide means for securing the device, when folded, in the pocket of the user.

The plunger is initially assembled with a bushing 18 and with the helical spring 14. The spring is secured to the bushing by a press fit, and the bushing and the spring then placed in the barrel. The outside diameter of the top of the spring is a press fit in the end of the barrel.

In one particular form the spring is 0.041 inch diameter music wire stock with a total coil length of about 1 3/16 inches. The three top turns of the coil are of about 0.380 inch diameter. With this dimensioning and the bushing mounted in the spring, the barrel having an internal diameter of 0.374 inch, the plunger with its spring and bushing combination is forced into the barrel. This provides a secure connection between the spring and the barrel but the plunger is reciprocable in the bushing against the spring. With this dimensioning, the total length of the finished arm is 6.4 inches, with the pivot pin 21 properly positioned so that the tip 11 extends below the bottom of the arm 0.1000 inch. With the spread of the arm 20 of 3.200 inches on each side of the pivot pin 21, the tension of the belt is determined by the three-point contact of the ends of the arm and the tip 11, providing the belt with a deflection of 1/64" per inch of belt span.

Figure 2:
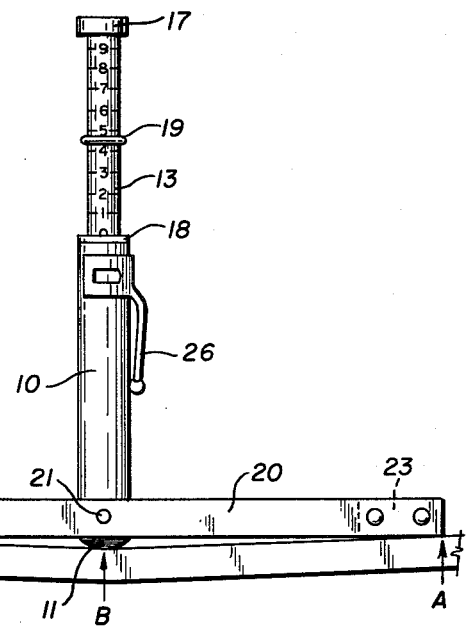
FIG. 2 is a side elevational view of a belt tester according to the invention in operative position.
Figure 3:
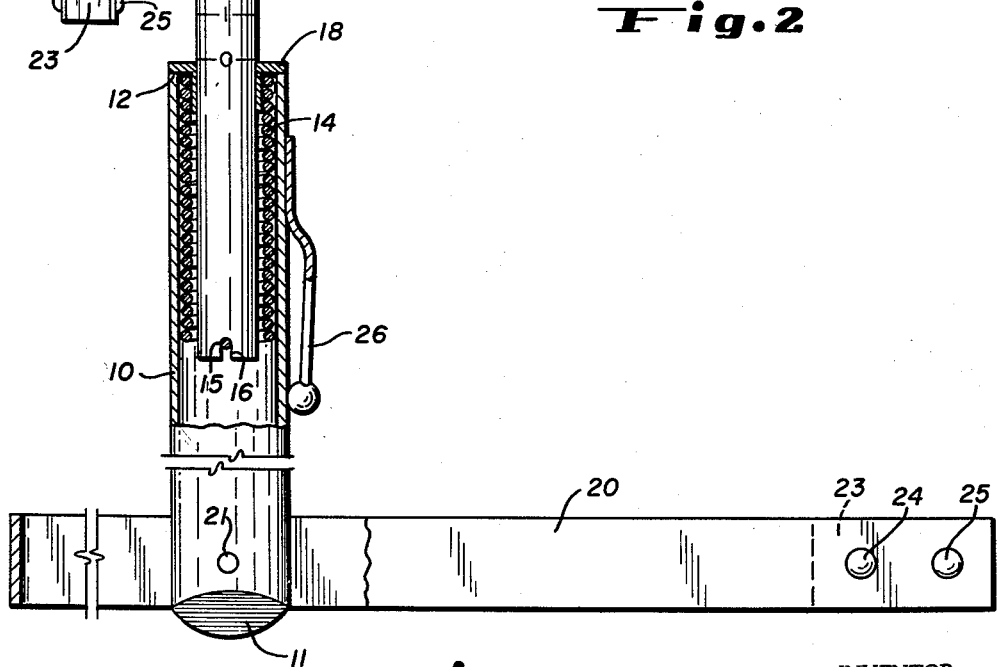
FIG. 3 is a partial detailed side elevational view of a tester in partial cut-away, showing the relation of the parts thereof.

In use the arm 20 is unfolded to its position in FIG. 2, and the O-ring 19 is pushed down adjacent the top of the bushing 18. The device is then placed in about the middle of a belt 30 (FIG. 2) with the tip 11 in approximately the middle part of the belt between the two pulleys. The plunger is then manually pushed to where a three-point contact occurs between each end of the arm and the tip of the barrel, shown in FIG. 2 at points A, B and C. When the three-point contact is achieved the pressure is released, and the plunger under spring tension returns to its normal extended position. The O-ring, which has been held by the bushing as the plunger moves inwardly, indicates the point of maximum travel of the plunger into the barrel.

The scale may be marked off in actual pounds of tension, or it may be such a scale as shown, which requires a converter table for converting the reading of the scale to actual pounds of tension in the belt. However, a scale such as shown may be used without converting to actual pounds for specific sizes of belts, for example number 5 may indicate correct tension and lower numbers would indicate insufficient tension, and the larger numbers would indicate excessive tension. A converter table, where desired, may be etched on the arm 20 for convenience or it may be a separate table.

The size indicated above is adequate for testing automobile fan belts and the like. However, for various other types of belts the size may be varied to meet the particular conditions, and in such cases the spring may, also, be varied to meet the particular condition.

While the invention has been illustrated with reference to a particular device, there is no intent to limit the spirit and scope of the invention to the precise details so set forth except as defined in the following claims.

I claim:

1. A belt tension tester comprising a tubular body having a closed end, an elongated member pivotally secured to said body adjacent said closed end and spaced therefrom leaving a belt contact protruding tip, said member being pivotal from a position axially aligned with said tubular body to a position perpendicular thereto, belt contacting portions on said elongated member adjacent each end thereof and spaced equidistant from said tip, a plunger mounted in said body, spring means mounted in said body biased against said plunger, and indicating means on said plunger for indicating the pressure necessary to form three point contact with a belt when pressure is applied to said plunger.

2. A belt tension tester comprising a tubular body having a rounded closed end, an elongated member pivotally secured to said body adjacent said closed end and spaced therefrom leaving a belt contact protruding tip, said elongated member having parallel arms pivotally attached to opposed sides of said tubular body and having ends extending beyond said tubular body, belt contacting portions on said elongated member adjacent each end thereof and spaced equidistant from said tip, said belt contacting portions connecting the adjacent ends of said parallel arms whereby said body is pivotal to the space between said arms and said arms are pivotal to a position perpendicular to said body, a plunger mounted in said body, spring means mounted in said body biased against said plunger, a scale on said plunger, and a movable O-ring on said plunger for indicating on said scale the pressure necessary to form three point contact with a belt when pressure is applied to said plunger.

References Cited by the Examiner

UNITED STATES PATENTS

| | | | |
|---|---|---|---|
| 1,922,895 | 8/33 | Lemaire | 33—169 |
| 2,373,338 | 4/45 | Rakauskas | 33—173 |

FOREIGN PATENTS

| | | |
|---|---|---|
| 32,524 | 4/08 | Australia. |

RICHARD C. QUEISSER, *Primary Examiner.*
JOSEPH P. STRIZAK, *Examiner.*